United States Patent [19]
Dodt

[11] Patent Number: 4,680,975
[45] Date of Patent: Jul. 21, 1987

[54] TEST STAND FOR POWER PLANTS AND METHOD

[75] Inventor: Hans-Walter Dodt, Muehltal, Fed. Rep. of Germany

[73] Assignee: Carl Schenck AG, Fed. Rep. of Germany

[21] Appl. No.: 835,047

[22] Filed: Feb. 28, 1986

[30] Foreign Application Priority Data

Mar. 1, 1985 [EP] European Pat. Off. ............ 85102310

[51] Int. Cl.⁴ .............................................. G01L 3/16
[52] U.S. Cl. ................................................. 73/862.09
[58] Field of Search .......... 73/862.09, 862.11–862.18, 73/650; 464/92, 97

[56] References Cited

U.S. PATENT DOCUMENTS

| | | | |
|---|---|---|---|
| 2,347,208 | 4/1944 | Martin | 73/862.11 |
| 2,571,267 | 10/1951 | Ljunggren | 464/92 X |
| 3,280,624 | 10/1966 | Weinert | 73/650 X |
| 4,023,405 | 5/1977 | Larson | 73/862.09 |

FOREIGN PATENT DOCUMENTS 2057347 5/1972 Fed. Rep. of Germany .
2543940 4/1977 Fed. Rep. of Germany .

OTHER PUBLICATIONS

Messtechnik, "Drehzahl-Drehmoment-Messeinrichtung", vol. 80, No. 12, p. 59, Dec., 1972.

*Primary Examiner*—Charles A. Ruehl
*Attorney, Agent, or Firm*—Connolly and Hutz

[57] ABSTRACT

Test stands for power plants generally include a power absorbing unit for absorbing the power of the plant under test. The allowable measuring speed of the power absorbing unit depends on permissible additional weight on the coupling flange which serves to interconnect the power plant to one end of the power absorbing unit. In order to avoid the detrimental influence of increased amplitudes caused by torsional resonances the weight that exceeds the permissible weight is transferred to the opposite end of the power absorbing unit and the torque of the power plant is introduced in dampened form at that end.

9 Claims, 5 Drawing Figures

TEST STAND FOR POWER PLANTS AND METHOD

BACKGROUND OF THE INVENTION

The present invention addresses a method for the operation of a test stand for power plants, such as internal combustion engines and the like, the test stand having a brake or power absorption unit (PAU) which absorbs the power of the power plant. A damper is interconnected between the prime mover of the power plant and the PAU.

For the development of power plants, especially internal combustion engines which show a relatively high degree of nonuniformity of torque which causes a variation in angular velocity, devices are necessary for the investigation of the dynamic conditions of the engine such as the dynamic shaft torque. This is generally done in power test stands for power plants whereby the power plant is connected to a cradle mounted PAU by means of a drive connecting shaft. Possible PAUs are electric eddy current dynamometers, water brakes, DC or AC electric dynamometers or hydraulic pumps, which are cradled. The torque of the power plant to be investigated, for instance an internal combustion engine, is measured in the form of force on a given torque arm considering the rotational speed.

Since the PAUs and the internal combustion engines, connected via couplings, represent oscillating systems, the danger of occurrence of torsional resonances exists, especially during the determination of the dynamic shaft torque on the output shaft or the flywheel of the internal combustion engine being investigated. These torsional resonances may lead to the destruction of the interconnecting shaft.

To avoid potentially destructive torsional oscillations, torsionally elastic, dampening coupling shafts are used and arranged between the PAU and the internal combustion engine. However, such torsionally elastic, dampening coupling shafts are sensitive to radial and angular misalignments and are therefore subject to excessive wear if the shafts of the PAU and the internal combustion engine exhibit even a slight such misalignment. Also, the range of operating speeds for which such couplings can be utilized is often not sufficient.

For measuring the dynamic shaft torque, torque sensors are often arranged between the internal combustion engine and the PAU. Such torque sensors must however be oversized because of the torque amplitude increase within the torsional resonance speed range. This leads to a condition where the required accuracy of measurement can no longer be attained.

To avoid oversizing of the torque sensor, an elastic, dampening element may be connected between the motor under test and the torque sensor. Even with such an arrangement the required accuracy of measurement of the dynamic shaft torque cannot be attained, because the mechanical oscillatory energy which is converted into heat in the elastic, dampening element is not measured by the torque meter.

The elastic, dampening element may, however, also be arranged between the torque sensor and the PAU. Because of the additional weight of the elastic, dampening element, however, the critical rotational speed of the PAU with respect to bending vibrations is influenced and decreased to such an extent that the dynamic performance of the internal combustion engine at maximum speed cannot be determined.

In the case of DC machines used as PAUs, torque computers are used to determine torque. The torque reaction of the electric generator is calculated from the magnetic air gap energy. As a result of erroneous input and/or changing losses, the required accuracy is not achieved. In addition there is no provision for simple calibration.

In cases of internal combustion engines with a relatively high degree of non-uniformity of torque, when ignition fails in one cylinder, it is possible that the torque meter may be destroyed. Because of these conditions, torque sensors that have practically no dampening except for material dampening, must be constructed considering the amplitude increase which occurs at the torsional resonance speed. This results, by necessity, in a reduction of measuring accuracy.

Thus in order to determine the dynamic torque of an internal combustion engine as accurately as possible, that is to minimize measuring errors, and in order to avoid destruction of the torque sensor, the torsional resonance speed must be chosen to lie outside of the speed range of the power plant being investigated. Preferably, the torsional resonance speed should lie below the operating speed of the power plant. In this case the system is used above critical speed. The means indicated above for reducing the amplitude increase through incorporation of an elastic, dampening element in the torsional resonance speed range, and arranging the elastic, dampening element in such a way that the dynamic shaft torque will be received directly by the torque sensor is not successful. The reason is because of the decrease in the critical rotational speed with respect to bending for a PAU whose original layout was for maximum motor speed and that no longer can be used at maximum speed because of excessive coupling weight.

SUMMARY OF THE INVENTION

With the above as background, the present invention eliminates the damaging influences of amplitude increases caused by resonating torsional vibrations. Through the reduced influence of the weight that goes beyond the permissible weight on the other end of the PAU, not only is the permitted bending critical speed of the PAU hardly influenced, but also the torsional resonance speed is so detuned that torque sensors can be used for the determination of the dynamic shaft torque which no longer need oversizing because of torsional resonances. Beyond this, torsionally stiff drive shafts can now be used for quasi-static measuring processes as a result of the detuning, which drive shafts, compared with the present damage susceptible torsion elastic and dampening coupling shafts, allow a much greater radial and angular misalignment between the motor under test and the PAU. Also, with respect to the use of DC machines used as PAUs, a simple dynamic check of the calibration is possible.

A PAU has a shaft on which a rotor is arranged. The shaft is held in the housing of the PAU by means of bearings and a coupling flange is used for the introduction of the torque that is to be transmitted. Through the use of a hollow shaft for the rotor in combination with a torsion bar which carries a damper on one end which damper in turn is connected to the hollow shaft and thus to the rotor, the weight that exceeds the permissible additional weight is carried by the end of the shaft which is opposite to the coupling flange and simultaneously a dampening is effected.

A modification of the PAU provides that the torsion bar is modified into a torque sensor, e.g. through the application of strain gauges. Hereby, the separate torque sensor between the PAU and the power plant, that was previously needed in order to measure the dynamic shaft torque is not necessary. This leads to a substantially more compact design of such a test stand and at the same time reduces cost since the otherwise needed couplings can be eliminated.

A special modification of the bearing construction for the torsion bar in the hollow shaft may be used where largely friction free movement of the torsion bar results from the torque acting on the bar. Such can advantageously be achieved through a ball bearing arrangement.

A PAU is also suitable wherein the hollow shaft and the coupling flange connected to the torsion bar are separately carried from each other by bearings in the housing of the PAU. This results in a shortening of the hollow shaft which with respect to the permissible bending critical speed causes a further increase of same so that also with respect to this criterion a further increase in the power performance of the PAU is achieved. When compared to PAUs used to date, this leads to considerable cost savings for such test stands.

Preprogrammed test sequences can be carried out including speed changes from idle to maximum speed, shifting of gears, acceleration and deceleration maneuvers to which the power plant under test is continuously subjected.

A test stand for carrying out the method according to the invention with a PAU according to the invention is distinguished through cradle mounting of the PAU and through the use of a torsionally stiff drive shaft between the PAU and the power plant under test. Only with a PAU constructed according to the invention is it possible to lower the torsional resonance speed so far that torsionally stiff couplings and universal joint drive shafts can be used without danger. Compared with the previously used dampening coupling shafts, universal joint drive shafts are much less sensitive to radial and angular misalignment between the PAU and the power plant under test so that misalignment related wear of couplings is no longer occurring. This leads to a shortening of the test cycle time in the production of engines for cars and trucks.

In a test stand for carrying out the inventive method, the PAU used may be mounted in stationary fashion and the torque sensor which may be the inventive torsion bar inside the power brake, may be connected with the power plant under test. This test stand is particularly well suited for the measurement of the dynamic shaft torque of power plants. Also it allows checking of the calibration of the PAU during use if the normally arrested carcass of the PAU is freed in accordance with the invention so that it is free to rotate around the torque sensing shaft. With a given rotational speed and a given torque the force action of the torque upon the power brake can be determined. Thus a check of the calibration can be carried out during operation of the PAU which so far was not possible. So far calibration checks were done at standstill.

BRIEF DESCRIPTION OF THE DRAWING

Novel features and advantages of the present invention in addition to those discussed above will become apparent from a reading of the following detailed description in conjunction with the accompanying drawing wherein.

DETAILED DESCRIPTION OF THE INVENTION

Figure 1:
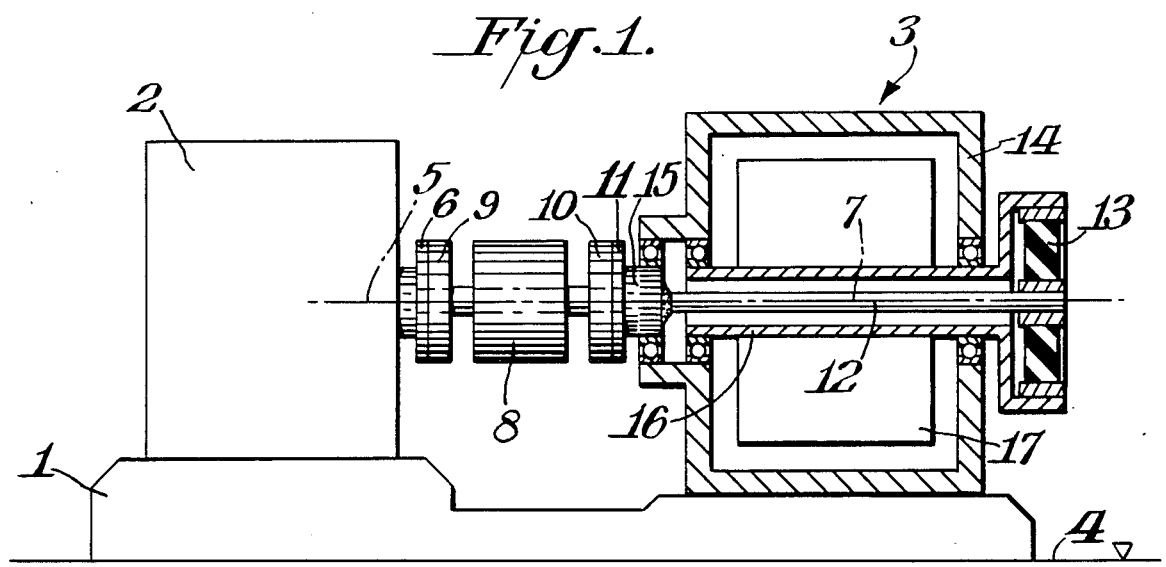
FIG. 1 is a side elevational view of a test stand for power plants, according to the present invention, with portions thereof in section.

Referring in more particularity to the drawing, foundation 1 supports a power plant 2 to be investigated and a PAU 3. Such foundation may be constructed as a single piece with the floor or it may be connected to the floor by means of screw bolts, if desired. Foundation 1 and the support portions thereof serve the purpose of aligning the power plant 2 with the PAU 3. If power plant 2 is an internal combustion engine it is obvious that because of unavoidable housing tolerances from engine to engine, axis 5 of flywheel 6 will occupy different heights with respect to foundation 1. This necessarily leads to radial and angular misalignment of the shaft axis 7 of the PAU 3, which is also anchored to foundation 1. Any such misalignment causes torsional resonance which leads to destruction of the dampening couplings.

As shown in FIG. 1, PAU 3 is connected via a torque sensor 8 to the power plant 2. The torque sensor 8 is connected via flywheel adaptor 9 to the flywheel 6 on one side and via adaptor 10 to the coupling flange 11 of the PAU 3 on the other side.

Figure 4:
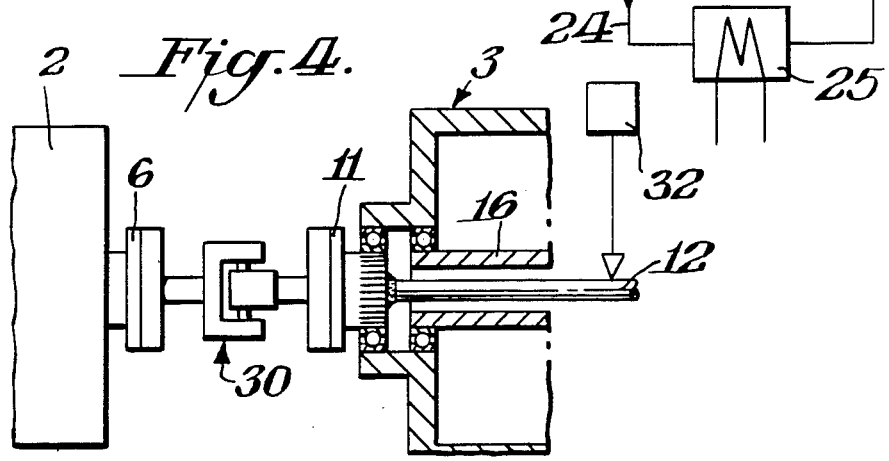
FIG. 4 is a fragmental side elevational view of another embodiment of the present invention, with portions thereof in section to show interior detail.

While FIG. 1 shows a test stand equipped for the measurement of the dynamic shaft torque with a torque sensor 8, this torque sensor 8 can also be replaced by a modified torsion bar 12 inside PAU 3. The torsion bar carries the connecting flange 11 on one side and a damper 13 may be arranged on the opposite side of the bar. In this case the modified torsion bar 12 would be equipped with strain gauges, for example, in order to measure the torsion which power plant 2 introduces into the torsion bar 12. If the torsion bar 12 is used as a torque sensor, then the connecting flange 11 would be connected torsionally stiff to flywheel 6, for instance by means of a universal joint drive shaft. Such an arrangement is shown in FIG. 4 wherein strain gauge 32 is attached to torsion bar 12.

Figure 5:
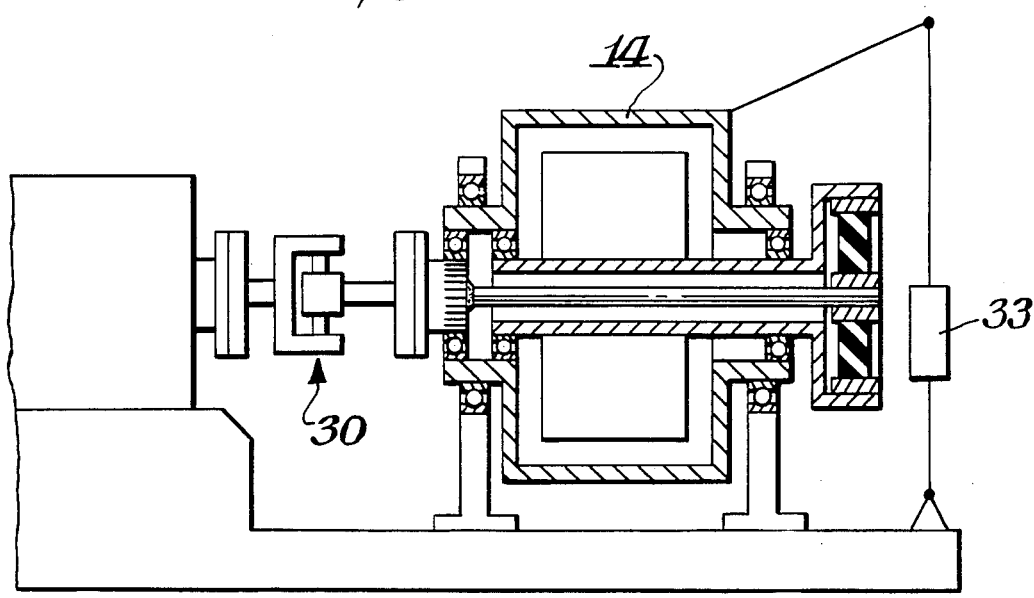
FIG. 5 is a view of still another embodiment of the present invention.

The test stand of FIG. 1 is also suitable for carrying out static measurements if the torque sensor 8 between the flywheel 6 and flange 11 is replaced by a stiff coupling, for instance a universal joint drive shaft. In this case the PAU 3 would be cradle mounted. By cradling it is understood that the torque induced in housing 14 of PAU 3 is reacted by foundation 1 through a force measuring member, for instance a load cell 33. If power plant 2 delivers torque at a given speed via a universal joint drive shaft arranged between flywheel 6 and flange 11 and such torque is introduced into PAU 3, then housing 14 of the PAU experiences a rotation around the shaft axis 5 which will be transmitted as a force to a force measuring member, for instance a load cell. Such transmission continues as long as needed to establish equilibrium between the force acting on a given torque arm and the induced torque. By means of the speed and the measured force on a given torque arm length, the power of the power plant under test can be determined. The embodiment is shown in FIG. 5

FIG. 1 shows a torsion bar 12 fastened to flange 15 via a spline and flange 15 held in housing 14 by means of a bearing. A hollow shaft 16 carries the rotor 17 of the PAU 3. FIG. 1 schematically shows an electric eddy current brake as the PAU. Instead of this arrangement, electrical machines may also be used as the PAU, such as DC or AC machines or water brakes.

The hollow shaft 16 has one of its bearings separated from coupling flange 15 mounted on the one side of the housing 14 of the PAU 3. The other bearing is on the other side also in housing 14 of the PAU. The torsion bar 12 extends through the hollow shaft 16 and is connected to the hollow shaft via the damper 13. In this case the torsion bar 12 does not need any additional bearing support within the hollow shaft.

Because the separate bearing arrangement for the coupling flange 15 and hollow shaft 16 on the one side of the PAU, a shortening of the hollow shaft is achieved which leads to an increase of the critical speed with respect to bending. As shown in FIG. 1, the coupling flange 15 is loaded by the torque sensor 8. Arrangement of the damper 13 on the opposite end of the hollow shaft 16 and torsion bar 12 causes the required coupling weights to be distributed to both shaft ends, which allows the weight of the damper to be in addition to the permissible additional weight. The damper arrangement results in a reduction of the torsional resonance speed of the two mass system. Through use of the damper, the system is operating above its torsional resonance speed. This operation above resonance speeds is of particular advantage in cases of power plants which have a relatively high degree of non-uniformity such as one or multicylinder internal combustion engines where the danger of one cylinder missing exists.

The test stand shown is suitable for measurement of the dynamic shaft torque whereby PAU 3 solely serves the purpose of energy conversion. If the calibration of the PAU is to be checked, such a check can be carried out during the operation of the test stand at predetermined speed and predetermined torque of the power plant. This is also true in cases where the torsion bar within the PAU is used as torque sensor.

Figure 2:
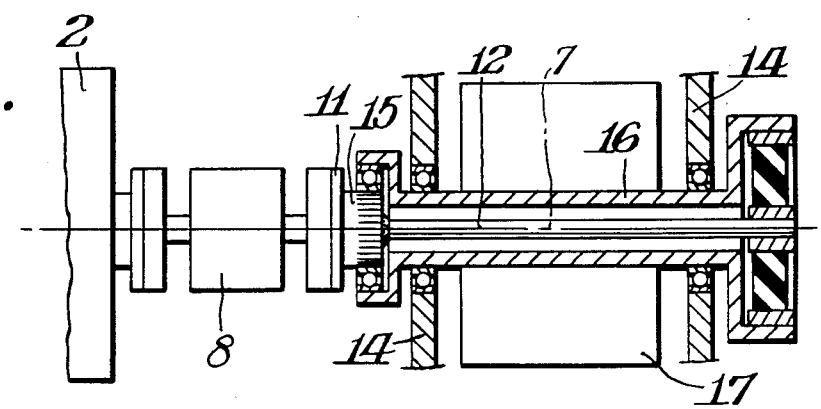
FIG. 2 is a fragmental side elevational view of a modified test stand for power plants, according to the present invention, with portions thereof in section to show interior details.

FIG. 2 shows an arrangement of torque bar 12 as a torque sensor. Here the torsion bar 12 is supported largely friction free within the hollow shaft 16. As shown in FIG. 2, the hollow shaft 16 is additionally loaded through the weight of the torque sensor 8. This causes a decrease of the critical bending speed of the system consisting of hollow shaft 16 with the applicable masses of the rotor 17 and coupling flange 11,15. With the arrangement of damper 13 on the opposite end of the hollow shaft 16 and torsion bar 12, a weight is introduced which could be in excess of the permissible additional weight on the coupling side. Also, this arrangement causes dampening at the locus of origin of the weight which leads to a reduction of the torsional resonance speed.

Figure 3:
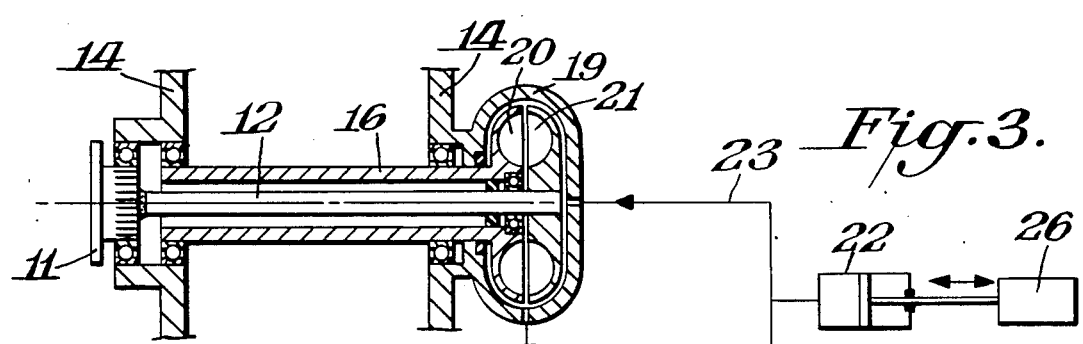
FIG. 3 is a partial side elevational view of a different power absorbing unit, according to the present invention.

If a torque converter is used instead of a damper, it is possible to operate the PAU at a lower speed than the power plant by changing the entry level of the converter. FIG. 3 illustrates such an arrangement wherein the machine is operated below torsional resonance speeds. In FIG. 3 a torque converter 19 is connected with housing 14. The hollow shaft 16 is connected to the turbine part 20 of the converter 19 while the impeller part 21 of the torque converter 19 is connected to the torsion bar 12.

By changing the degree of fill in the torque converter the speed difference between the PAU and the power plant under test is given. Thus it is possible in an especially simple way to allow the power plant under test to run at a higher speed than the PAU, for instance a DC machine. Through this arrangement DC machines with relatively low standard nominal speed may be used as a PAU for high speed power plants.

FIG. 3 schematically shows the filling scheme of the converter 19. From a reservoir 22 the desired amount of liquid is introduced to the torque converter via operator 26. Through return line 24 a closed circuit is achieved. In accordance with the desired speed differential more or less liquid may be introduced into the circuit from reservoir 22.

When the degree of fill is to be lowered for example, an amount of liquid is fed back from the circuit to reservoir 22. Preferred in this circuit is a heat exchanger 25 that transfers the converter created heat to cooling water.

FIG. 4 and FIG. 5 show a universal joint drive shaft 30 and FIG. 4 a strain gauge 32 also.

What is claimed:

1. A method of operating a test stand for power plants wherein the power plant under test is connected to a power absorbing unit at one end thereof by a coupling flange and wherein the allowable measuring speed of the power absorbing unit depends on the permissible additional weight on the coupling flange, the method including the step of locating excess weight above the permissible additional weight at the other end of the power absorbing unit and introducing torque from the power plant under test to such other end of the power absorbing unit dampened form.

2. A method as in claim 1 wherein the weight exceeding the permissible additional weight is equal to the permissible additional weight.

3. A test stand for a power plant comprising a power absorbing unit having a hollow shaft with a rotor connected thereto, a housing for the shaft and rotor, and bearing means between the hollow shaft and the housing, torque dampening means at one end of the power absorbing unit connected to the hollow shaft, a torsion bar within the hollow shaft connected at one end thereof to the torque dampening means, and coupling means on the other end of the torsion bar for connecting a power plant to be tested.

4. A test stand as in claim 3 wherein the dampening means comprises a torque converter.

5. A test stand as in claim 3 including strain gauge means connected to the torsion bar for determining torque applied to the bar.

6. A test stand as in claim 3 including further bearing means between the coupling means and the hollow shaft.

7. A test stand as in claim 3 including further bearing means between the coupling means and the housing.

8. A test stand as in claim 3 wherein the housing is stationary and a torque sensor is connected between the coupling means and a power plant to be tested.

9. A test stand as in claim 3 wherein the housing is cradle mounted, a torque sensor connected to the housing, and a torsionally stiff connection between the coupling means and a power plant to be tested.

* * * * *